(12) United States Patent
Choi et al.

(10) Patent No.: US 11,258,554 B1
(45) Date of Patent: Feb. 22, 2022

(54) METHOD AND APPARATUS FOR SEQUENTIALLY DETECTING AND DECODING SPARSE CODE MULTIPLE ACCESS SIGNAL FOR MULTIPLE USERS

(71) Applicant: RESEARCH COOPERATION FOUNDATION OF YEUNGNAM UNIVERSITY, Gyeongsan-si (KR)

(72) Inventors: Kwon Hue Choi, Gyeongsan (KR); Dong Jun Na, Gyeongsan (KR)

(73) Assignee: RESEARCH COOPERATION FOUNDATION OF YEUNGNAM UNIVERSITY

( * ) Notice: Subject to any disclaimer, the term of this patent is extended or adjusted under 35 U.S.C. 154(b) by 0 days.

(21) Appl. No.: 17/077,512

(22) Filed: Oct. 22, 2020

(30) Foreign Application Priority Data

Aug. 24, 2020 (KR) .......................... 10-2020-0106538

(51) Int. Cl.
*H04L 5/00* (2006.01)
*H04J 99/00* (2009.01)

(52) U.S. Cl.
CPC ............ *H04L 5/0016* (2013.01); *H04J 15/00* (2013.01)

(58) Field of Classification Search
CPC ................................ H04L 5/0016; H04J 15/00
See application file for complete search history.

(56) References Cited

U.S. PATENT DOCUMENTS

| | | | |
|---|---|---|---|
| 2016/0211867 A1* | 7/2016 | Guillemette | ....... H03M 13/1114 |
| 2017/0019222 A1* | 1/2017 | Ge | .................... H04L 25/03229 |
| 2017/0265213 A1* | 9/2017 | Guillemette | ....... H03M 13/1137 |
| 2020/0145272 A1 | 5/2020 | Choi et al. | |
| 2020/0374054 A1* | 11/2020 | Shattil | ................... H04L 5/0005 |

OTHER PUBLICATIONS

Dongjun Na, Kwonhue Choi The Journal of Korean Institute of Communications and Information Sciences '20-07 vol. 45 No. 07 (w/Abstract and partial English translation) (8 pages), Published in Jul. 2020.

* cited by examiner

*Primary Examiner* — Hoon J Chung
(74) *Attorney, Agent, or Firm* — Harness, Dickey & Pierce, P.L.C.

(57) ABSTRACT

The present disclosure provides a method and apparatus for sequentially detecting and decoding multiuser sparse code multiple access (SCMA) signal. A detection method includes selecting a single variable node depending on how much the plurality of variable nodes each use function nodes that connect to updated variable nodes; updating messages passed to the single variable node, based on a function node input message passed to the plurality of function nodes and signals received by the plurality of function nodes through channels; mapping updated messages to a priori information of a channel decoder; inputting the priori information to the channel decoder and thereby obtaining probability information of a symbol for the single variable node; and updating messages passed from the single variable node to one of the plurality of function nodes by applying a weight to the probability information of the symbol for the single variable node.

14 Claims, 7 Drawing Sheets

METHOD AND APPARATUS FOR SEQUENTIALLY DETECTING AND DECODING SPARSE CODE MULTIPLE ACCESS SIGNAL FOR MULTIPLE USERS

CROSS-REFERENCE TO RELATED APPLICATIONS

This application is based on, and claims priority from, Korean Patent Application Number 10-2020-0106538, filed Aug. 24, 2020, the disclosure of which is incorporated by reference herein in its entirety.

TECHNICAL FIELD

The present disclosure in some embodiments relates to a method and apparatus for joint detection and decoding of multiuser sparse code multiple access (SCMA) and channel code.

BACKGROUND

The statements in this section merely provide background information related to the present disclosure and do not necessarily constitute prior art.

Next-generation wireless communication networks require consistently high service quality, fast transmission speed, and low latency according to increasing traffic. In response to this demand, a Non-Orthogonal Multiple Access (NOMA) method is in the spotlight. Among NOMA methods, the Sparse Code Multiple Access (SCMA) method is receiving a lot of attention thanks to its high spectrum efficiency and large-scale access capability.

SCMA is a NOMA method for the frequency domain, and it is one of the improved Low Density Spreading Code Division Multiple Access (LDS-CDMA) methods. SCMA is capable of about three times more access than a conventional multiple access method based on Orthogonal Frequency Division Multiple Access (OFDMA). Most of the NOMA techniques suffer from the increasing complexity of a detection apparatus to detect a non-orthogonal signal.

To solve such complexity of a detection apparatus, a SCMA has been developed to be capable of lowering the complexity of the detection process by using a Message Passing Algorithm (MPA) using sparsity. In other words, sparsely encoded wireless data can be decoded by using a technique such as the MPA. With a SCMA decoder, the MPA is an iterative algorithm that has the detection apparatus infers the transmitted SCMA codeword by updating and passing a message indicating the probability of each codeword from the received signal using a codebook.

On the other hand, to increase spectral efficiency in the physical layer of wireless communication and to ensure the quality of service (QoS), SCMA performs channel coding. Channel coding may be divided into a turbo code, a low-density parity-check (LDPC) code, and a polar code. The turbo code is a key channel code in Third Generation (3G) and Fourth Generation (4G) communication standards, having powerful error correction functions and flexibility. The LDPC code has the advantage of having a fast decoding process, so it is a channel code comparable to the turbo code in the Fifth Generation (5G) communication standardization work. On the other hand, the polar code is one of the most recently developed channel codes. The polar code has superior error correction capability for a shorter block length over the LDPC code or turbo code, and it is a code chosen for the downlink control channel of 5G communication.

To efficiently detect channel-coded SCMA signals, research has been actively conducted on a detection apparatus for joint SCMA detection and channel coding.

To demodulate the channel-coded SCMA signal, the detection process and the decoding process need to be iteratively performed. To obtain reliable estimation data through this iteration disadvantageously increases the computational burden. As an improvement over architecture as illustrated in FIG. 1A, the conventional joint detection and decoding method as illustrated in FIG. 1B could achieve a lower bit error rate (BER) performance with a smaller number of iterative cycles. FIGS. 1A and 1B will be fully described below.

However, to achieve BER performance, there is still unsolved matter of a heavy computation burden by an iteration and a high complexity issue.

SUMMARY

According to at least one embodiment, the present disclosure provides a detection method for detecting a sparse code multiple access (SCMA) signal for multiple users, including steps that are performed for a given iteration. The detection method includes the steps of selecting a single variable node from among a plurality of variable nodes depending on how much the plurality of variable nodes each use function nodes that connect to already updated variable nodes; updating messages passed to the single variable node from a plurality of function nodes that connect to the single variable node, based on a function node input message passed to the plurality of function nodes and signals received by the plurality of function nodes through channels; mapping updated messages to a priori information of a channel decoder; inputting the priori information to the channel decoder and thereby obtaining probability information of a symbol for the single variable node; and updating messages passed from the single variable node to one of the plurality of function nodes by applying a weight to the probability information of the symbol for the single variable node.

According to another embodiment, the present disclosure provides a detection apparatus for detecting a sparse code multiple access (SCMA) signal for multiple users and including units that perform for a given iteration. The units include a SCMA detector, a mapping unit, a channel decoder, and a remapping unit. The SCMA detector is configured to lselect a single variable node from among a plurality of variable nodes and to update messages passed to the single variable node from a plurality of function nodes that connect to the single variable node, based on a function node input message passed to the plurality of function nodes that connect to the single variable node and signals received by the plurality of function nodes through channels. The mapping unit is configured to map an updated message to a priori information of a channel decoder. The channel decoder is configured to update the priori information by decoding the priori information. The remapping unit is configured to map the priori information to probability information of a symbol for the single variable node. The SCMA detector is configured to update a message passed from the single variable node to one of the plurality of function nodes by applying a weight to the probability information of the symbol for the single variable node.

DETAILED DESCRIPTION

Figure 1A:
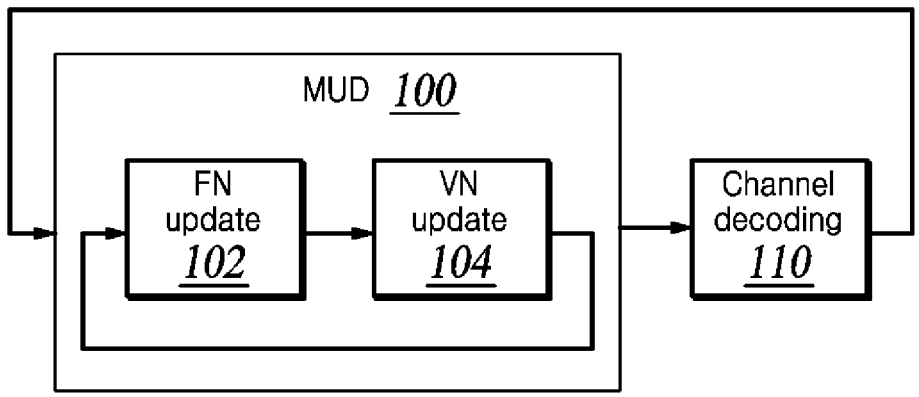
FIG. 1A is a diagram of a conventional technique with a multiuser detection process and a decoding process combined in comparison with FIG. 1C of a sequential detection process of sequentially detecting a SCMA signal for multiple users according to at least one embodiment of the present disclosure.

Some embodiments of the present disclosure provide a sequential detection method and apparatus capable of performing the SMCA detection and decoding process for each user and thereby using a detection result of a user updated earlier in a given iteration for the detection and decoding process for the other users to lower the complexity and reduce the number of iterative cycles to achieve the BER performance.

Other embodiments of the present disclosure provide a sequential detection method and apparatus capable of achieving better BER performance by using a detection result of a user updated earlier in a given iteration for detection and decoding of the other users.

Yet other embodiments of the present disclosure provide a sequential detection method and apparatus capable of performing a channel decoding step between a function node update process and a variable node update process, thereby increasing BER performance through an error correction function of a channel decoder in the variable node update process.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, various terms such as first, second, A, B, (a), (b), etc., are used solely for the purpose of differentiating one component from others but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

An additional explanation of this specification may be found in [Z. Pan, E. Li, L. Zhang, J. Lei, and C. Tang, "Design and optimization of joint iterative detection and decoding receiver for uplink polar coded SCMA system," IEEE Access, vol. 6, pp. 52014-52026, October 2018].

Hereinafter, SCMA is a coding method that enables multiple access by using different codebooks for different multiplexing layers through non-orthogonal multiplexing of the code layer (variable node), resource overloading, and spreading across several subcarriers (function nodes). As the demand for communication systems increases, such coding and multiple access techniques can be used to support larger amounts of data traffic in wireless communication systems. In particular, the SCMA data stream transfers encoded data by using multidimensional codewords, not Quadrature Amplitude Modulation (QAM) symbol mapping. The sparse codeword takes a low complexity algorithm such as the iterative message passing algorithm (MPA) to be used for the receiver to detect the receiver's codeword from the combined codeword that the receiver has received.

The network as used herein includes, but is not limited to, the fourth generation (4G) network, and it may vary according to one or more communication or data standards or technologies. Alternatively, the network may be a future communication network, Long-Term Evolution (LTE), Universal Mobile Telecommunications System (UMTS), 5G, 6G, and other wireless or mobile communication networks.

The detection apparatus refers to any apparatus or device that can be connected to a mobile network through wireless communication, even if it is not a mobile device. For example, in an LTE network, the user terminal may be a user equipment (UE), a wireless transmit/receive unit (WTRU), a mobile station (MS), a mobile terminal, a smartphone, a cellular phone, a sensor, or other wireless-enabled devices. The user terminal has a function of transmitting, receiving, or transceiving data in a communication network.

The detection apparatus may include a base station, evolved NodeB (eNB), an access point (AP), or other network interfaces. The base station is capable of communication with respective user terminals by establishing uplink and downlink communication channels with respective devices. Communication in the network may be either unscheduled or scheduled by the base station, or it may be a mixture of scheduled communication and unscheduled communication.

For example, communication in a network between a user terminal and a base station may be implemented by encoding transmission data by using a sparse encoding such as SCMA encoding. SCMA codewords are provided as a set of codebooks and are used to directly map binary data to multidimensional codewords. Codebooks are respectively associated with different layers (variable nodes or users) so that multiple data streams can be communicated through shared physical resources in the network. Each layer or codebook may correspond to a user terminal of the network. The user terminal or the base station has information on the codebook used to encode the transmitted data.

In the uplink, a plurality of layers may be allocated to the same user terminal, the same layer may be allocated to a plurality of user terminals, or one or more different layers may be allocated to the user terminal. In the downlink, the layer allocation can be dynamically signaled to the user terminal so that the allocation for the user terminal can be changed from one frame to the next.

Figure 1B:
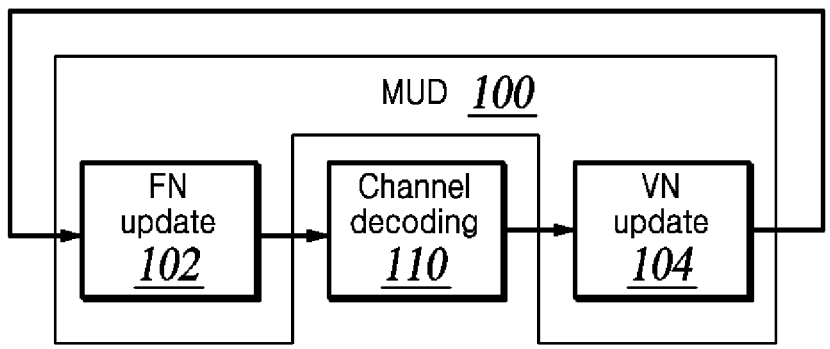
FIG. 1B is a diagram of a conventional technique with a multiuser detection process and a decoding process combined in comparison with FIG. 1C of a sequential detection process of sequentially detecting a SCMA signal for multiple users according to at least one embodiment of the present disclosure.
Figure 1C:
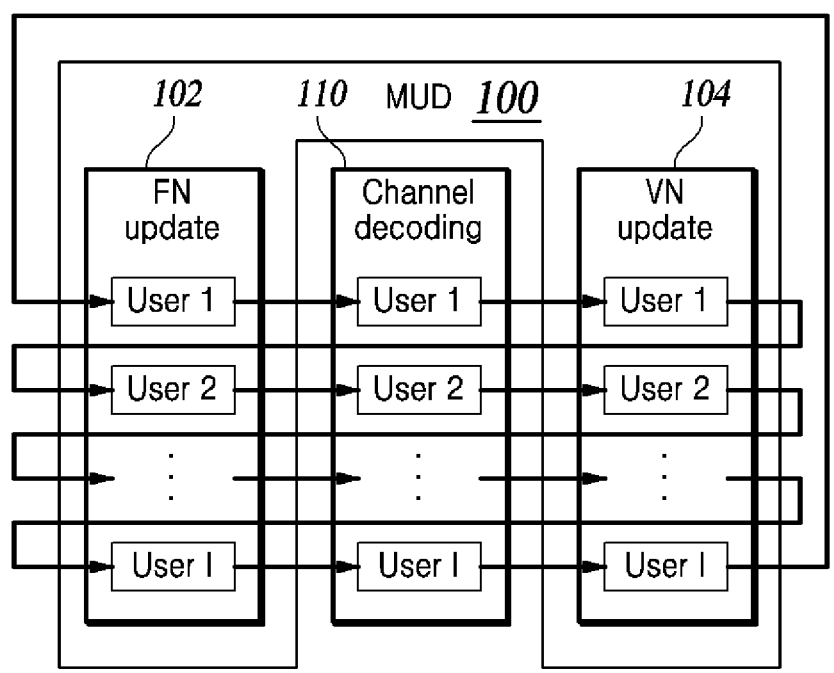
FIG. 1C is a diagram of a sequential detection process.

FIGS. 1A and 1B are diagrams of conventional techniques with a multiuser detection process and a decoding process combined in comparison with FIG. 1C of a sequential detection process of sequentially detecting a SCMA signal for multiple users according to at least one embodiment of the present disclosure.

Existing SCMA detection methods may be classified into two general methods as follows. The first method involves sequentially performing a SCMA detection step and a channel decoding step. In this method, after completing the SCMA detection step for all users, the detection result is used in the channel decoding step. A detection apparatus estimates demodulated data for multiple users by performing the detection process and the decoding process repeatedly. The second method involves jointly performing the SCMA signal detection step and the channel decoding step. In this method, the SCMA detection step is divided into a function node update process and a variable node update process, and the function node update process is performed first. And the result of the function node update is used in the channel decoding step. Then, the result of the decoding process is used for the variable node update process. This is repeated to estimate transmission data for multiple users. The second method can take advantage of the error correction function of the channel decoding step when updating the variable node to obtain a performance gain over the first method. Both methods will be described referring to FIGS. 1A and 1B.

As the first method, FIG. 1A illustrates an Iterative Detection and Decoding (IDD) process. The IDD process includes an iterative Multiuser Detection (MUD) step 100 and a channel decoding step 110. The MUD step 100 includes a function node update process 102 and a variable node update process 104. An algorithm, which has the MUD step 100 and the decoding step 110 combined, is referred to as an IDD process.

In the IDD process, the MUD step 100 and the channel decoding step 110 are iteratively performed by using the respective output extrinsic messages of the MUD step 100 and the channel decoding step 110. In particular, the output extrinsic message of the MUD step 100 is used as a priori information of the channel decoding step 110, and the output extrinsic message of the channel decoding step 110 is used as a priori information of the MUD step 100.

As in the IDD process shown in FIG. 1A, the sequential detection technique by the MUD step 100 and the channel decoding step 110 does not support utilizing the internal message updated in the MUD step 100 and the channel decoding step 110, failing to achieve optimal performance.

As the second method, FIG. 1B illustrates a Joint-Iterative Detection and Decoding (J-IDD) process. As with the IDD process, the J-IDD process includes the MUD step 100 and the channel decoding step 110. However, unlike the IDD process, the channel decoding step 110 is performed between the function node update process 102 and the variable node update process 104.

This J-IDD process applies to a channel coded-Sparse Code Multiple Access (SCMA) system. The SCMA system to which the J-IDD process is applied achieves very high spectral efficiency, has low complexity, and enables large-scale access. Besides, the J-IDD process can improve the MUD performance and bit error rate (BER) convergence speed, since it can make full use of the output extrinsic message from the channel decoder when detecting the SCMA signal.

However, the J-IDD process is performed in parallel for multiple users, which does not allow making full use of the internal message updated in the MUD step 100 and the channel decoding step 110, thus posing a limitation to obtaining optimal performance.

FIG. 1C illustrates a sequential detection process that sequentially detects a SCMA signal for multiple users according to at least one embodiment of the present disclosure. A sequential detection apparatus according to at least one embodiment of the present disclosure performs respective processes for each user. Upon completion of the process of updating the variable node for one user, the update result is used in the process of updating the function node for the next user. Compared to the J-IDD process in FIG. 1B, the sequential detection process can sharply improve the MUD performance in terms of BER performance and convergence speed and it takes a smaller number of iterations to achieve the same BER performance and convergence speed, thereby reducing the computational complexity for the detection process. The sequential detection process will be detailed referring to FIGS. 2 to 6.

Figure 2:
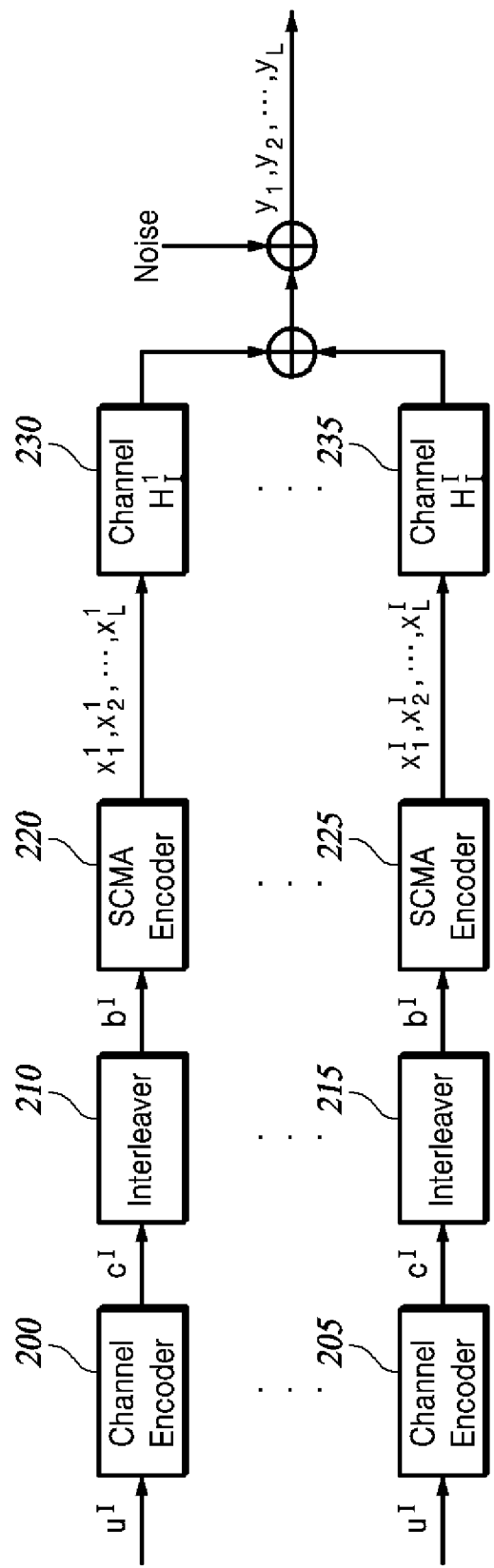
FIG. 2 is a diagram of an uplink channel code SCMA system for data of multiple users.

FIG. 2 is a diagram of an uplink channel code SCMA system for data of multiple users.

In FIG. 2, there are shown a plurality of channel encoders 200, 205, a plurality of interleavers 210, 215, a plurality of SCMA encoders 220, 225 and a plurality of channels 230, 235. Each component may include one or more entities according to the number of users. Hereinafter, the description is based on one user, and the same description may be applied to the remaining users.

In FIG. 2, $u^i_l = \{u^i_{l,1}, u^i_{l,2}, \ldots, u^i_{l,m}\}$ represents a data bit sequence of user i in the l-th data block. Here, i denotes the index of the user, and the range of user i is $1 \leq i \leq I$. The l-th data bit sequence of the i-th user is inputted to the channel encoder 200 and is encoded by the channel encoder 200 into a bit sequence $c^i_l = \{c^i_{l,1}, c^i_{l,2}, \ldots, c^i_{l,N}\}$. The encoded bit sequence is inputted to the interleaver 210. $b^i_l = \{b^i_{l,1}, b^i_{l,2}, \ldots, b^i_{l,N}\}$ is the result of the interleaver 210 performing random interleaving on the output of the channel encoder 200. When the number of modulation symbols in the SCMA system is M, respective bits of $b^i_l$ are gathered in groups of $Q = \log_2 M$ and are mapped by the SCMA encoder 220 to a J-dimensional complex codeword, $x^i_l = \{x^i_{l,1}, x^i_{l,2}, \ldots, x^i_{l,J}\}$. $x^i_l$ represents the l-th codeword of the i-th user. At this time, the length L of the SCMA codeword per L frame becomes N/Q. Additionally, when I users each use the J-dimensional complex codeword, an overloading factor of SCMA becomes I/J.

In SCMA, a codeword is transmitted by being spread over J orthogonal resources. Here, the orthogonal resource means one of a resource element or a subcarrier. SCMA's codeword contains 0 and non-zero elements which signify the nonuse and use of orthogonal resources, respectively.

Meanwhile, in the uplink channel code SCMA system, the channel gain matrix H for the channel 230 between the i-th user and the base station in the l-th data block, that is, the l-th SCMA codeword, may be expressed as Equation 1.

$$H^i_l = \begin{bmatrix} h^i_{l,1} & & & \\ & h^i_{l,2} & & \\ & & \ddots & \\ & & & h^i_{l,j} \end{bmatrix} = \mathrm{diag}(h^i_{l,1}, h^i_{l,2}, \ldots, h^i_{l,J}) \quad \text{Equation 1}$$

In Equation 1, $h^i_{l,j}$ denotes a channel matrix between the i-th user and the base station for the j-th resource in the l-th SCMA codeword. j is the index of the orthogonal resource.

In this case, for the l-th data block, received signals that the base station receives from multiple users may be expressed as in Equation 2.

$$y_l = \sum_{i=1}^{I} H_l^i x_l^i + z_l, \, 1 \leq l \leq L \qquad \text{Equation 2}$$

In Equation 2, $y_l^i = [y_{l,1}^i, y_{l,2}^i, \ldots, y_{l,J}^i]^T$ represents a received signal for the l-th data block, and $x_l^i = [x_{l,1}^i, x_{l,2}^i, \ldots, x_{l,J}^i]^T$ represents the l-th codeword of the i-th user. And $z_l^i = [z_{l,1}^i, z_{l,2}^i, \ldots, z_{l,J}^i]^T$ represents the Additive White Gaussian Noise (AWGN) that follows the distribution of $CN(0, N_0 I)$.

In the AWGN channel, $|h_{l,1}^i|^2 = 1$ and $\angle h_{l,1}^i$ is independent of l and j and may be an independent random variable derived from a uniform distribution. Assuming a sufficiently long interleaving and physical separation between the transmitter and the receiver in the Rayleigh fading channel, $h_{l,1}^i$ can be modeled as an independent complex Gaussian random variable.

Figure 3:
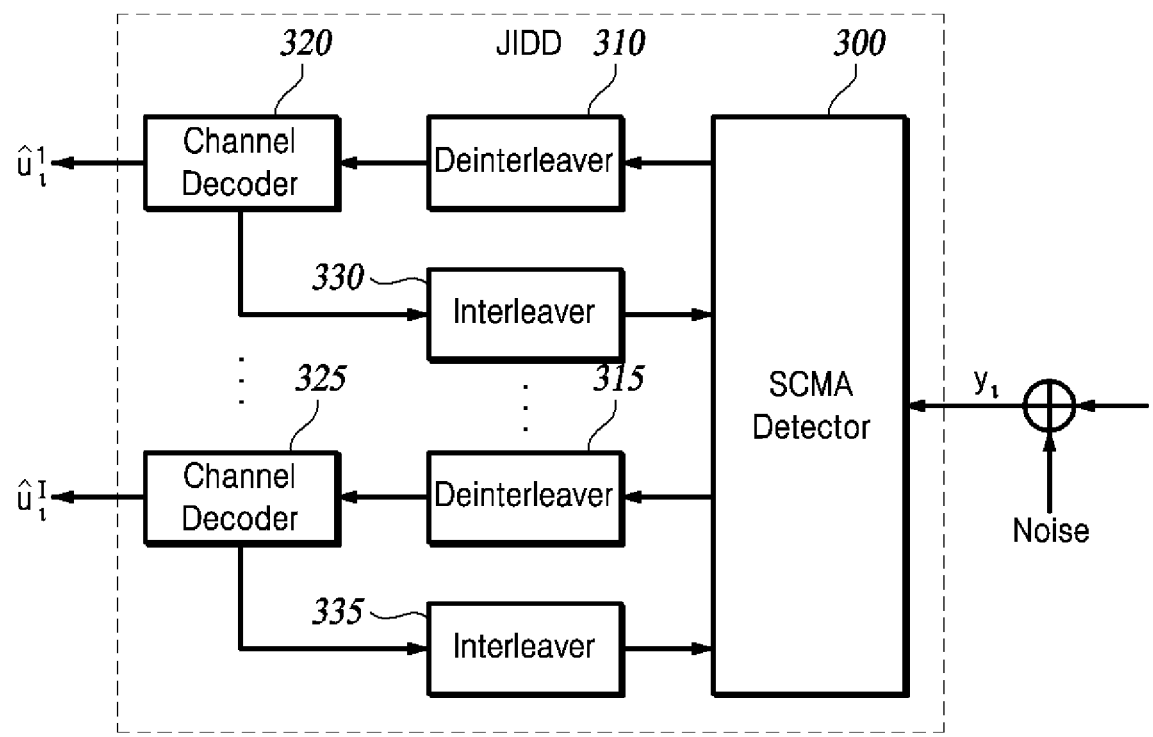
FIG. 3 is a diagram of an example configuration of a detection apparatus according to at least one embodiment of the present disclosure.

FIG. 3 is a diagram of an example configuration of a detection apparatus according to at least one embodiment of the present disclosure.

The detection apparatus determines a conditional channel probability (CCP) based on a signal received for each resource element, channel estimation, and noise power. Thereafter, the detection apparatus performs inference on the transmitted bit by using a message passing algorithm (MPA) that exchanges and updates a value (or message) representing the probability that the received SCMA codeword is each of the M possible codewords in the SCMA codebook. Here, the message means a trust message or a probability.

As shown in FIG. 3, the detection apparatus according to at least one embodiment of the present disclosure includes a SCMA detector 300, a deinterleaver 310, a channel decoder 320, and an interleaver 330. In FIG. 3, the deinterleaver 310 is referred to as a 'mapping unit 310' and the interleaver 330 is referred to as a 'remapping unit 330'. The detection apparatus includes the mapping unit 310 and the remapping unit 330 between the SCMA detector 300 and the channel decoder 320.

The detection apparatus may further include one or more antennas and a receiving circuit to convert an analog signal into a digital signal and perform filtering. The detection apparatus may further include a prior probability generator between the channel decoder 320 and the SCMA detector 300.

The SCMA detector 300 is a component that sequentially performs a function node update process and a variable node update process for a plurality of variable nodes.

Specifically, the SCMA detector 300 selects a single variable node from among a plurality of variable nodes for a given iteration. The SCMA detector 300 selects the single variable node depending on how much the plurality of variable nodes each use function nodes that connect to already updated variable nodes. Hereafter, "connet to" means "associated with" or "related to". The SCMA detector 300 according to at least one embodiment can select, as the single variable node, a variable node that shares the most the function nodes that connect to the updated variable nodes when the plurality of variable nodes include variable nodes whose output messages have been updated in the given iteration.

The SCMA detector 300 updates messages passed to the selected single variable node from a plurality of function nodes that connect to the single variable node, based on a function node input message passed to the plurality of function nodes that connect to the single variable node and signals received by the plurality of function nodes through channels.

Here, when the plurality of variable nodes includes variable nodes that pass messages to the plurality of function nodes and the variable nodes include an updated variable node whose output messages have been updated in the given iteration, the function node input message according to at least one embodiment of the present disclosure contains a message that is transmitted from the updated variable node to the plurality of function nodes. According to another embodiment, when the plurality of variable nodes includes variable nodes that pass messages to the plurality of function nodes and the variable nodes include an un-updated variable node whose output messages have not been updated in the given iteration, the function node input message contains an output message of the un-updated variable node having been updated in a previous iteration.

When updating a message transmitted to a variable node, the SCMA detector 300 according to at least one embodiment updates a message passed from the single variable node to one of the plurality of function nodes by applying a weight to probability information of a symbol for the single variable node.

Additionally, between the function node update process and the variable node update process, the SCMA detector 300 may use the message passing algorithm (MPA) to obtain the log-likelihood ratio (LLR) of the encoded bits for variable nodes each corresponding to a received signal. In particular, the SCMA detector 300 may obtain the LLR of the encoded bits for the data stream of each user terminal as a conditional probability of the received signal.

The mapping unit 310 is a component that maps the updated message to a priori information of the channel decoder 320. Here, the priori information of the channel decoder 320 means LLR information of the bits encoded for the single variable node.

The channel decoder 320 is a component that updates the priori information by decoding the priori information. The channel decoder 320 may reduce a bit error rate for LLR information of encoded bits by decoding the priori information.

Specifically, $P(x_l^i)$, which is LLR information for the encoded bits, is updated by the channel decoder 320 based on the function node message, and the updated LLR information is used to update the priori information. Here, the set of LLR values represents the inferred values of the transmitted bits. A subset of LLR values exists for each active SCMA layer. The number of LLR values per LLR set varies depending on the codebook used for the relevant SCMA layer. The LLR generated by the SCMA detector 300 is additionally decoded by the channel decoder 320 to reconstruct the encoded data sequence.

The channel decoder 320 according to at least one embodiment is a turbo decoder, a polar code decoder, or another type of FEC decoder. When the channel decoder 320 is a turbo decoder, the detection apparatus uses a log-maximum a posteriori (log-MAP) algorithm. When the channel decoder 320 is a polar decoder, a soft cancellation (SCAN) algorithm is used. In addition, the channel decoder is not limited thereto and may be implemented with various types of decoders.

The remapping unit 330 is a component that maps the priori information to probability information of a symbol for the single variable node. Here, the probability information of the symbol for the single variable node means a probability domain value as converted from the LLR value of the symbol for the single variable node. Here, the LLR value is obtained from the channel decoder.

The detection apparatus according to at least one embodiment further includes an estimation unit (not shown) adapted to operate, upon completion of a given iteration, to estimate data bits for each of the plurality of variable nodes based on probability information of the symbols for the plurality of variable nodes.

Specifically, the detection apparatus performs the SCMA detection step and the channel decoding step combined, but sequentially for each user. The detection apparatus may repeat the entire process several times to obtain a probability of a data sequence detected as an output of a variable node or a codeword of a specific variable node. The detection apparatus obtains the final demodulated data $\hat{u}^1_I, \hat{u}^2_I, \ldots, \hat{u}^i_I$ from the probability of the codeword.

Figure 4:
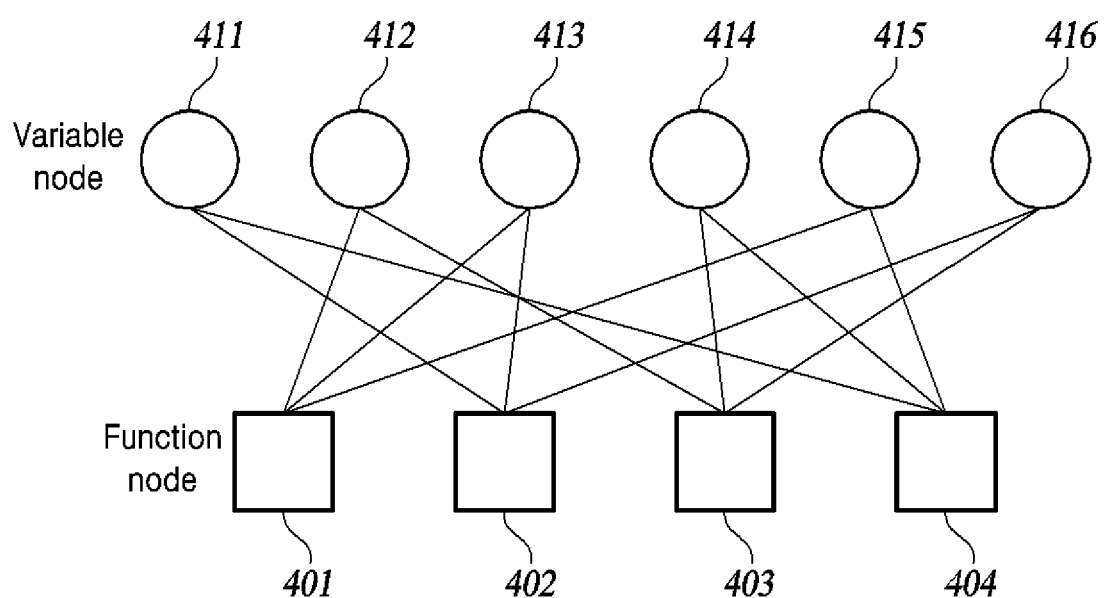
FIG. 4 is a factor graph in a SCMA detector according to at least one embodiment of the present disclosure.

FIG. 4 is a graph of factors in a SCMA detector according to at least one embodiment of the present disclosure.

As shown in FIG. 4, a plurality of variable nodes 411, 412, 413, 414, 415, 416 and a plurality of function nodes 401, 402, 403, 404 are implemented in the SCMA detector. The plurality of variable nodes 411 to 416 represent data streams, codebooks, or layers for users, and the plurality of function nodes 401 to 404 represent orthogonal resources. The edge between the variable node and the function node represents the relationship of the SCMA codebook spread over a plurality of resource elements or subcarriers with the MPA decoding process.

In FIG. 4, the number of variable nodes is six and the number of function nodes is four. This is merely an illustrative embodiment, and the numbers of variable nodes and function nodes may vary. The number of variable nodes that are associated and mapped to each of the plurality of function nodes may be variously adjusted, and different numbers of variable nodes may be associated and mapped to the respective function nodes. Further, different numbers of function nodes may be associated and mapped to the plurality of variable nodes, respectively.

In the SCMA system, multiple user terminals or variable nodes may share and use time and frequency resources. This allows more user terminals than the number of resource blocks to communicate with the base station. This means that each codeword is transmitted by spreading over the four function nodes, which are physical resource elements.

Meanwhile, the factor graph of FIG. 4 may be expressed by a J×I matrix as shown in Equation 3.

$$F = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix} \quad \text{Equation 3}$$

In Equation 3, 0 and 1 represent the absence or presence of an edge between the function node and the variable node. Specifically, an edge represents an association mapping between a variable node and a function node. In the SCMA system, each user terminal or variable node may not share and use all resource blocks, but it may be pre-designated to use some resource blocks designated by association mapping among a plurality of resource blocks. At this time, a plurality of user terminals may receive a pre-configuration signal designating an available resource block from the base station in advance and thereby check the resource blocks that they can use.

Referring back to FIG. 4, depending on a codebook design, three variable nodes may connect to a single function node, and two function nodes may connect to a single variable node. The user's codeword includes information on whether or not the function node is used, and there are two non-zero elements in all codewords of FIG. 4.

Conventional detection apparatuses perform a process including passing and updating the first message of the conditional channel probability (CCP) by passing the first message in parallel from the plurality of function nodes 401, 402, 403, 404 to the plurality of variable nodes 411, 412, 413, 414, 415, 416 and then again passing and updating the message by passing the message in parallel from the plurality of variable nodes 411, 412, 413, 414, 415, 416 to the plurality of function nodes 401, 402, 403, 404. Here, the message represents the probability that the received signal transmitted through the function node is each of the M possible codewords from the codebook. The probability values converged through the iteration are used to determine each symbol for the codebook associated with the transmitting user terminal.

When passed from some variable nodes to the associated function node, the message is updated based on the message that is inputted to all other function nodes that connect to some variable nodes in conventional detection apparatuses. Reversely, the message is updated based on the message that is inputted to all other variable nodes that connect to some function nodes.

In other words, the message passed from the second function node 402 to the first variable node 411 is updated based on the message passed to the second function node 402 from the third variable node 413 and the sixth variable node 416 in conventional detection apparatuses.

Figure 5:
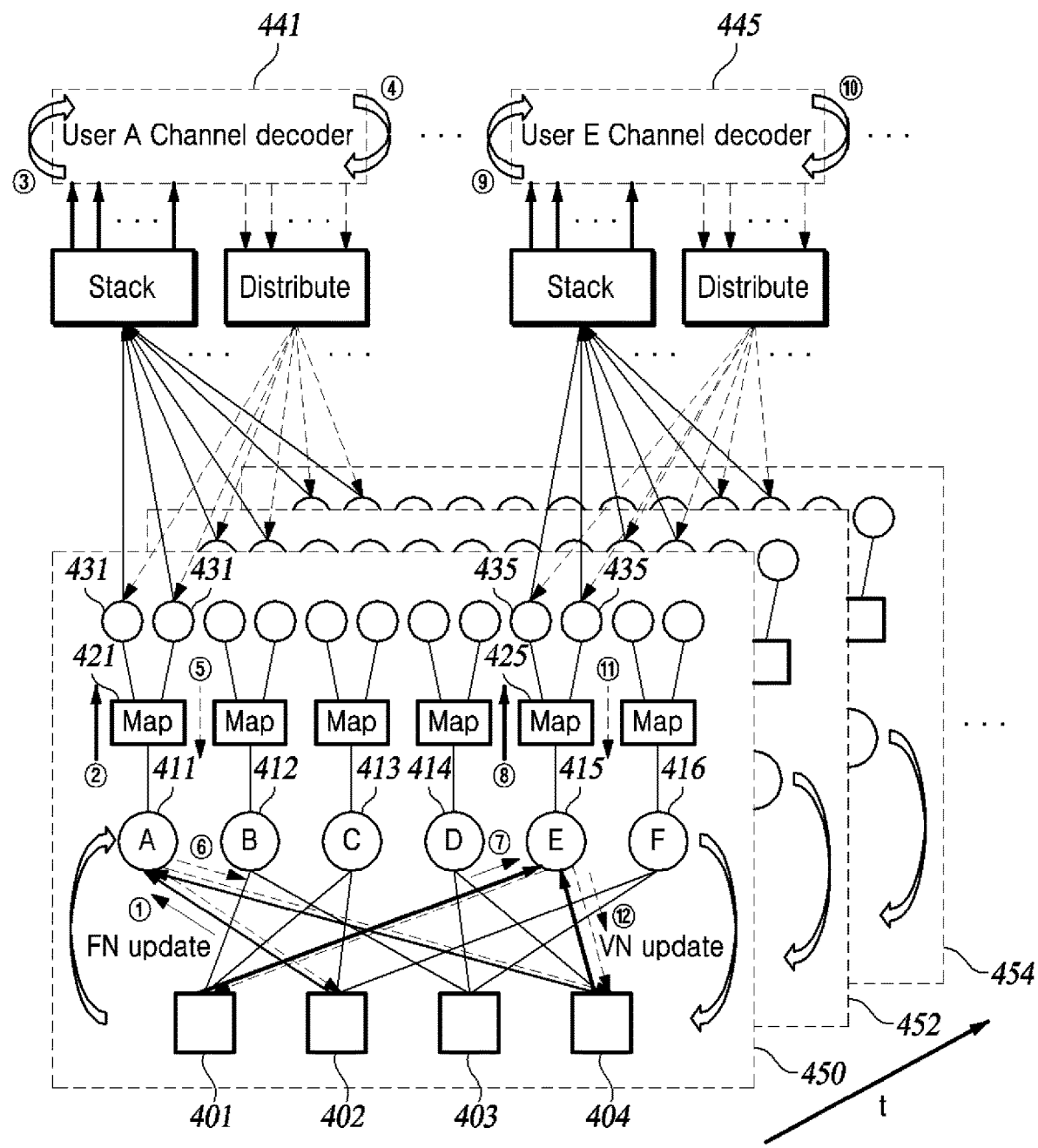
FIG. 5 is a diagram illustrating a detection process according to at least one embodiment of the present disclosure.

FIG. 5 is a diagram illustrating a detection process according to at least one embodiment of the present disclosure.

FIG. 5 shows a plurality of variable nodes, a plurality of function nodes, a plurality of mapping units, a plurality of a priori information items, and a plurality of channel decoders. Here, the plurality of mapping units may include remapping units, and they will be described as being implemented as one mapping unit.

A lower dotted box represents a SCMA detection step of ①, ②, ⑤–⑧, ⑪, and ⑫, and upper dotted boxes represent a channel decoding step of ③, ④, ⑨, and ⑩. Further, there is a mapping step of ②, ⑤, ⑧, and ⑩ for allowing messages to be exchanged between the SCMA step and the channel decoding step. Here, the mapping step includes an interleaving step and a deinterleaving step. Step ① and step ⑥ are the function node update process and the variable node update process, respectively. The function node update process is for updating the internal message passed from the function node to the variable node to obtain the SCMA detection result, and the variable node update process is for using the SCMA detection result decoded by the channel decoder for the next iteration and thereby updating the internal message to be passed from the variable node to the function node. Meanwhile, to iteratively exchange internal messages in the detection apparatus between the SCMA detector and the channel decoder, the detection apparatus implements a soft-input-soft-output (SISO) algorithm. In particular, a soft cancellation (SCAN) algorithm is used in the channel decoding step.

The detection apparatus according to at least one embodiment of the present disclosure sequentially performs a SCMA detection process and a decoding process for each user.

In the τ-th iteration, the internal message that connects to the variable node $v_i$ from the function node $f_j$ may be expressed as Equation 4.

$$I^T_{f_j \to v_i(x_l^i)} = \sum_{x^{Pl}, p \in [S_j^f \backslash i]} \{P(y_{l,i} | x_l^j, x_l^p, p \in \{S^f j \backslash i\}) \cdot I^P_{v \to f}\}, \quad \text{Equation 4}$$

$$1 \leq l \leq L$$

A message passed from the i-th variable node to the j-th function node is called a variable node message, and a message passed from the j-th function node to the i-th variable node is called a function node message. $I^{\tau}_{f_j \to v_i}$ refers to a function node message in the τ-th iteration. $\{S_j^f\}$ refers to a set of variable nodes that connect to the j-th function node. $\{S_j^f/i\}$ refers to a set of variable nodes excluding the i-th variable node among the variable nodes that connect to the j-th function node. $P(x_l^i)$ represents a priori information of the l-th SCMA codeword for user i.

In Equation 4, according to at least one embodiment of the present disclosure, $I^P_{v \to f}$ may be expressed as Equation 5.

$$I^P_{v \to f} = \begin{cases} \prod_{p \in \{S_j^f \backslash i\}} I^{\tau}_{v_p \to f_j}, (x^{Pl}), & \text{if } n_p < n_i \\ \prod_{p \in \{S_j^f \backslash i\}} I^{\tau-1}_{v_p \to f_j}, (x^{Pl}), & \text{if } n_p > n_i \end{cases} \quad \text{Equation 5}$$

In Equation 5, $n_p$, $n_i$ is the detection order of user p and user i, respectively. Where $n_p < n_i$, the present disclosure utilizes the internal message updated in the current iteration as the internal message of user p required to update the function node of user i. On the other hand, where $n_p > n_i$, the present disclosure utilizes the internal message updated in the previous iteration as the internal message of user p required to update the function node of user i.

Upon completion of the function node update process for user i, the updated internal message is mapped by the mapping step to a priori information of the channel decoder. The channel decoder receives the priori information of user i and performs a channel decoding step on the priori information of user i. The channel decoder updates probability information $P(x_l^i)$ of the l-th symbol for user i through the channel decoding step. The probability information of the l-th symbol for user i is used in the variable node update process.

The following describes a variable node update process according to at least one embodiment of the present disclosure performed by the detection apparatus.

In the existing joint-iterative detection and decoding (J-IDD) process, a decoding result message is outputted by adjusting the ratio of the internal message updated by the channel decoding step to the internal message before the channel decoding step, and a variable node update process is performed based on the decoding result message.

When the sequential multiuser detection apparatus according to at least one embodiment of the present disclosure updates a variable node according to the ratio of messages before and after channel decoding, differences in the scale may occur within one iteration between an internal message for an updated user and an internal message of an un-updated user.

To prevent this, the detection apparatus adjusts the weight of $P(x_l^i)$ in the variable node update process. In the sequential multiuser detection method according to at least one embodiment of the present disclosure, the internal message that connects to the function node $f_j$ from the updated variable node $v_i$, that is, the variable node update process is expressed as Equation 6.

$$I^{\tau}_{v_i \to f_j}(x_l^i) = P(x_l^i)^{\beta} \prod_{p \in \{S_{i/j}^f\}} I_{f_p \to v_i}(x^p_l) \quad \text{Equation 6}$$

In Equation 6, $P(x_l^i)$ is a probability domain value obtained by a conversion of the log-likelihood rate value of the l-th symbol of user i, which is obtained by the channel decoder, and β is a weight of $P(x_l^i)$.

The following describes a process of selecting a single variable node from among a plurality of variable nodes depending on how much the variable nodes each use a function node (orthogonal resource) associated with an already updated variable node (user).

FIG. 5 illustrates the process of detecting user A first and user E next. In FIG. 5, ① to ⑥ are the user A detection step. Upon completion of the user A detection step, the user E detection step of ⑦ to ⑫ is performed.

At the earliest stage, the detection apparatus can select any user A. User A shares a second orthogonal resource with users C and F and shares a fourth orthogonal resource with users D and E. After completing the detection step for user A in one iteration, the detection apparatus performs a detection step on the user who shares the most orthogonal resources associated with detected user A. The orthogonal resources associated with detected user A are the second orthogonal resource and the fourth orthogonal resource. Since no user shares both the second orthogonal resource and the fourth orthogonal resource, a user who shares one of the two orthogonal resources is searched for. Users who share either the second orthogonal resource or the fourth orthogonal resource are C, F, D, and E. The detection apparatus may perform a detection step for an arbitrary user when there is a plurality of users with the same ranking.

Whereas, when the detection apparatus performed the detection step of user C before performing the detection step of user A, it performs the detection step for the user who shares most of the second and fourth orthogonal resources associated with user A and the first and second orthogonal resources associated with user C. In FIG. 5, as the next user, user E is selected for sharing the first orthogonal resource and the fourth orthogonal resource. The above-described procedure is repeated until SCMA signals for all users are detected.

In this way, the detection apparatus according to at least one embodiment of the present disclosure can increase the BER performance gain by first completing the detection step of one user and then selecting as the next user to detect the user who shares the most orthogonal resources with users updated in the current iteration. In other words, probability or belief message is immediately propagated to be used in the subsequent message update to allow the use of the most recent message or node value when updating the next message, so that the updated internal message within a single iteration can be fully utilized, resulting in an improved BER performance.

In comparison, the existing detection method proceeds to the next iteration after updating message nodes for all users. In the present sequential multiuser detection method, message nodes are subdivided for each user, and in each process step, a message node is updated for just one user. Both methods have the same computational burden because of the same number of message nodes updated within one iteration, but the sequential multiuser detection method according to at least one embodiment of the present disclosure exhibits the excellent BER performance, requiring a smaller number of iterations to achieve the same BER performance.

Further, with the detection apparatus according to at least one embodiment of the present disclosure, the result message of the function node update process is not directly used in the variable node update process, but a channel decoding step is performed on the result message and then the decoded result message is used for the variable node update process. Accordingly, the detection apparatus performs a channel decoding step between the function node update process and the variable node update process, thereby obtaining a performance gain thanks to the error correction function of the channel decoder for each iteration.

Figure 6:
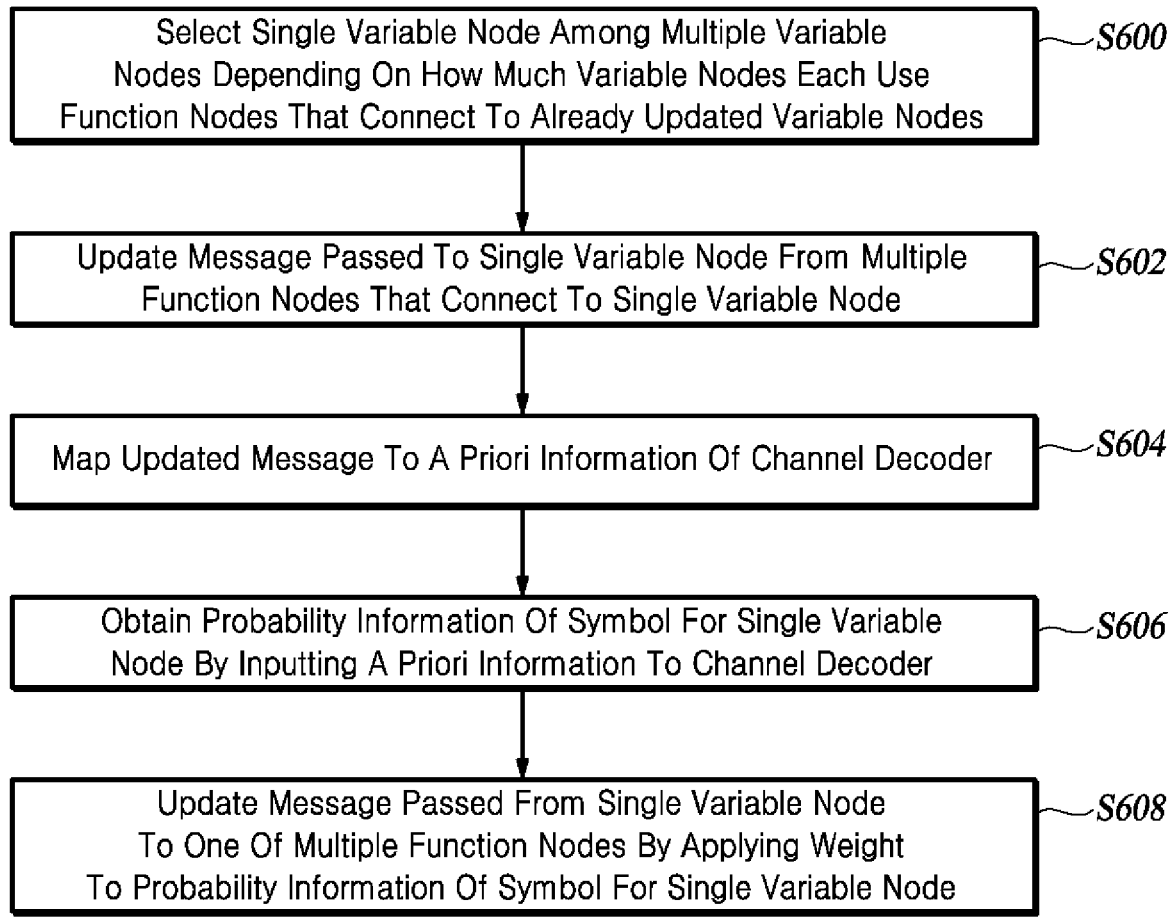
FIG. 6 is a flowchart of an example detection process according to at least one embodiment of the present disclosure.

FIG. 6 is a flowchart of an example detection process according to at least one embodiment of the present disclosure.

As shown in FIG. 6, for a given iteration, the detection apparatus selects a single variable node from among a plurality of variable nodes depending on how much the variable nodes each use the function node that connects to the already updated variable node (S600).

According to at least one embodiment of the present disclosure, when a plurality of variable nodes includes updated variable nodes whose output messages have been updated, the detection apparatus can select therefrom a single variable node that shares most of the function nodes that connect to the updated variable nodes.

Based on a function node input message transmitted to a plurality of function nodes that connect to the single variable node, and signals received by the plurality of function nodes through channels, the detection apparatus updates a message passed to the single variable node from the plurality of function nodes that connect to the single variable node (S602).

Here, the function node input message according to at least one embodiment of the present disclosure includes, when the variable nodes that pass a message to the plurality of function nodes include an updated variable node whose output message has already been updated in the given iteration, a message that is transmitted from the updated variable node to the plurality of function nodes. The function node input message may further include, when the variable nodes that pass a message to the plurality of function nodes include an un-updated variable node whose output message has not been updated in the given iteration, an output message having been updated in a previous iteration to the un-updated variable node.

The detection apparatus maps the updated message to a priori information of the channel decoder (S604). Here, the priori information of the channel decoder is log-likelihood ratio (LLR) information of bits encoded for the single variable node.

The detection apparatus obtains probability information of a symbol for the single variable node by inputting the priori information to the channel decoder (S606). Here, the probability information of the symbol for the single variable node is a probability domain value converted from an LLR value of the symbol for the single variable node. Here, the LLR value is obtained from the channel decoder.

The detection apparatus updates a message passed from the single variable node to one of the plurality of function nodes by applying a weight to the probability information of the symbol for the single variable node (S608).

Finally, upon completion of the given iteration, the detection apparatus estimates data bits for each of the plurality of variable nodes based on probability information of symbols for the plurality of variable nodes.

Although Steps S600 to S608 in FIG. 6 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 6 or by performing one or more of Steps S600 to S608 in FIG. 6 in parallel, without departing from the gist and the nature of the at least one embodiment of the present disclosure, and hence the steps in FIG. 6 are not limited to the illustrated chronological sequences.

The steps illustrated in FIG. 6 can be implemented as computer-readable codes on a computer-readable recording medium. The computer-readable recording medium includes any type of recording device on which data that can be read by a computer system are recordable. Examples of the computer-readable recording medium include a non-transitory medium such as a ROM, a RAM, a CD-ROM, a magnetic tape, a floppy disk, and an optical data storage and transitory medium such as a carrier wave (e.g., transmission through the Internet) and data transmission medium. Further, the computer-readable recording medium can be distributed in computer systems connected via a network, wherein the computer-readable codes can be stored and executed in a distributed mode.

Further, the components of the present disclosure may use an integrated circuit structure such as a memory, a processor, a logic circuit, a look-up table, and the like. These integrated circuit structures perform the respective functions described herein through the control of one or more microprocessors or other control devices. Further, the components of the present disclosure include one or more executable instructions for performing a specific logical function, and they may be specifically implemented by a part of a program or codes executed by one or more microprocessors or other control devices. Further, the components of the present disclosure may include or be implemented by a central processing unit (CPU), a microprocessor, and the like that perform the respective functions. Besides, the components of the present disclosure may store instructions executed by one or more processors in one or more memories.

As described above, at least one embodiment of the present disclosure can perform the SMCA detection and decoding process for each user and thereby using a detection result of a user updated earlier in a given iteration for the detection and decoding process for the other users, thereby lowering the complexity and reducing the number of iterative cycles to achieve the BER performance.

Another embodiment of the present disclosure achieves better BER performance by using a detection result of a user updated earlier in a given iteration for the detection and decoding of the other users.

Yet other embodiments of the present disclosure can perform a channel decoding step between a function node update process and a variable node update process, thereby increasing BER performance through an error correction function of a channel decoder in the variable node update process.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A detection method for detecting a sparse code multiple access (SCMA) signal for multiple users sequentially, the detection method comprising:
for a given iteration:
selecting a single variable node from among a plurality of variable nodes depending on how much the plurality of variable nodes each use function nodes that connect to already updated variable nodes;
updating messages passed to the single variable node from a plurality of function nodes that connect to the single variable node, based on a function node input message passed to the plurality of function nodes and signals received by the plurality of function nodes through channels;
mapping updated messages to a priori information of a channel decoder;
inputting the priori information to the channel decoder and thereby obtaining probability information of a symbol for the single variable node; and
updating messages passed from the single variable node to one of the plurality of function nodes by applying a weight to the probability information of the symbol for the single variable node.

2. The detection method of claim 1, wherein the selecting of the single variable node from among the plurality of variable nodes comprises:
when the plurality of variable nodes includes updated variable nodes whose output messages have been updated in the given iteration, selecting a variable node that shares the most the function nodes that connect to the updated variable nodes as the single variable node.

3. The detection method of claim 1, wherein the function node input message comprises:
when the plurality of variable nodes includes variable nodes that pass messages to the plurality of function nodes and the variable nodes include an updated variable node whose output messages have been updated in the given iteration, a message that is transmitted from the updated variable node to the plurality of function nodes.

4. The detection method of claim 1, wherein the function node input message comprises:
when the plurality of variable nodes includes variable nodes that pass messages to the plurality of function nodes and the variable nodes include an un-updated variable node whose output messages have not been updated in the given iteration, an output message of the un-updated variable node having been updated in a previous iteration.

5. The detection method of claim 1, further comprising:
upon completion of the given iteration, estimating data bits for each of the plurality of variable nodes based on probability information of symbols for the plurality of variable nodes.

6. The detection method of claim 1, wherein the priori information of the channel decoder comprises:
log-likelihood ratio (LLR) information of bits encoded for the single variable node.

7. The detection method of claim 1, wherein the probability information of the symbol for the single variable node comprises:
a probability domain value converted from an LLR value of the symbol for the single variable node,
wherein the LLR value is obtained from the channel decoder.

8. A detection apparatus for detecting a sparse code multiple access (SCMA) signal for multiple users sequentially, the detection apparatus comprising:
for a given iteration:
a SCMA detector configured to select a single variable node from among a plurality of variable nodes and to update messages passed to the single variable node from a plurality of function nodes that connect to the single variable node, based on a function node input message passed to the plurality of function nodes and signals received by the plurality of function nodes through channels;
a mapping unit configured to map updated messages to a priori information of a channel decoder;
a channel decoder configured to update the priori information by decoding the priori information; and
a remapping unit configured to map the priori information to probability information of a symbol for the single variable node,
wherein the SCMA detector is configured to update a message passed from the single variable node to one of the plurality of function nodes by applying a weight to the probability information of the symbol for the single variable node.

9. The detection apparatus of claim 8, wherein the SCMA detector is configured to:
when the plurality of variable nodes includes updated variable nodes whose output messages have been updated in the given iteration, select a variable node that shares the most the function nodes that connect to the updated variable nodes as the single variable node.

10. The detection apparatus of claim 8, wherein the function node input message comprises:
when the plurality of variable nodes includes variable nodes that pass messages to the plurality of function nodes and the variable nodes include an updated variable node whose output messages have been updated in the given iteration, a message that is transmitted from the updated variable node to the plurality of function nodes.

11. The detection apparatus of claim 8, wherein the function node input message comprises:
when the plurality of variable nodes includes variable nodes that pass a message to the plurality of function nodes and the variable nodes include an un-updated variable node whose output message has not been updated in the given iteration, an output message of the un-updated variable node having been updated in a previous iteration.

12. The detection apparatus of claim 8, further comprising:
an estimation unit configured to operate, upon completion of the given iteration, to estimate data bits for each of the plurality of variable nodes based on probability information of symbols for the plurality of variable nodes.

13. The detection apparatus of claim 8, wherein the priori information of the channel decoder comprises:
log-likelihood ratio (LLR) information of bits encoded for the single variable node.

14. The detection apparatus of claim 8, wherein the probability information of the symbol for the single variable node comprises:
- a probability domain value converted from an LLR value of the symbol for the single variable node,
- wherein the LLR value is obtained from the channel decoder.

* * * * *